United States Patent Office 2,957,903
Patented Oct. 25, 1960

2,957,903

STABILIZATION OF ORGANIC ISOCYANATES

Louis Spiegler, Woodbury, N.J., assignor to E. I. du Pont de Nemours and Company, Wilmington, Del., a corporation of Delaware No Drawing. Filed Mar. 24, 1959, Ser. No. 801,463

7 Claims. (Cl. 260—453)

This invention relates to organic compounds, and more particularly to the stabilization of organic isocyanates against discoloration.

Organic isocyanates, which in general are colorless liquids or solids, tend to become discolored on storage. On discoloration these organic isocyanates change from light yellow to brown in extreme cases, and while this color can be removed by distilling the isocyanates, the distilled products again become discolored on standing even in only a few hours.

The discoloration of these organic isocyanates presents a serious problem where colorless or very light colored reaction products are to be produced, for it is usually impractical to redistill the isocyanate immediately before use.

The exact cause of the color formation in the isocyanates is not known, for it has been found that when these products are stored in closed containers, the discoloration develops practically as fast as when the same products are stored in air. The presence of moisture may be a factor in causing this discoloration, but, again, it is impractical to package isocyanates, particularly when used in large commercial quantities, under absolutely moistureproof conditions.

It is therefore an object of the present invention to provide a simple and positive method for stabilizing organic isocyanates against discoloration. It is a further object of the invention to produce organic isocyanates which for extended periods of time do not become discolored even in thee presence of oxygen, moisture or light.

The present invention comprises the stabilization of organic isocyanates against discoloration by incorporating in the organic isocyanate from 0.05% to 0.5% of an essentially colorless triaryl phosphite which is essentially non-reactive with the organic isocyanate under ordinary atmospheric conditions.

These stabilizing agents are soluble in the organic isocyanates, which are normally liquids and may be readily dissolved in the melted organic isocyanates which at normal temperatures are solids. The amount of stabilizing agent employed will vary from 0.05 to 0.5% based on the weight of the isocyanate to be stabilized. Larger amounts of the stabilizers of course may be used up to their limit of solubility in the isocyanate, but unnecessarily large amounts of course are to be avoided since they merely constitute an impurity in the product. When the very small amounts are used, the effect of this impurity on the product is negligible.

The stabilizing agents which may be used according to the present invention are the triaryl phosphites which may be represented by the formula $(RO)_3P$ wherein R is an aryl radical. Representative aryl radicals include phenyl and naphthyl radicals which may be substituted with substituents inert to isocyanate groups such as alkyl radicals, alkoxy radicals, halogen radicals, nitro radicals, cyano radicals, etc. The preferred stabilizer is triphenyl phosphite. These phosphites are essentially colorless compounds.

The following examples are given to illustrate the present invention, it being understood that these examples are purely illustrative and that the invention is not to be restricted to the specific examples. Parts and percentages are by weight unless otherwise specified.

Example 1

An isomeric toluene diisocyanate containing 80% toluene-2,4-diisocyanate and 20% toluene-2,6-diisocyanate was distilled under vacuum (4 to 5 mm. of Hg). To 100 parts by weight of the colorless distillate maintained under an atmosphere of nitrogen was added 0.1 part by weight of triphenyl phosphite. Portions were then placed in small (about 10 ml.) screw cap vials which had been thoroughly washed and dried, the transfer being made under an atmosphere of nitrogen. A similar set of vials was prepared containing the distilled diisocyanate alone as a control.

One vial each of the control and the one containing 0.10% triphenyl phosphite were placed in open air at room temperature in diffuse daylight and the lids were placed on loosely. A second set was similarly placed in a glass desiccator at 20% relative humidity. The samples were examined for color using the conventional Barrett scale after 66 and 120 hours with the following results:

|  | Barrett color after— | |
| --- | --- | --- |
|  | 66 hours | 120 hours |
| Air-room temp.: | | |
| control | 0 | 1.0 |
| 0.1% triphenyl phosphite | 0 | 0 |
| Air-20% RH-room temp.: | | |
| control | 0.5 | 3.5 |
| 0.1% triphenyl phosphite | 0 | 0 |

Example 2

Toluene-2,4-diisocyanate was distilled under reduced pressure and the colorless liquid was placed in 500-ml. clear glass bottles. The bottles were filled nearly full and the lids were placed on loosely. To part of the samples, as shown in the table below, was added different proportions of triphenyl phosphite and the samples were exposed to ordinary atmospheric conditions in diffuse daylight. The color of the toluene diisocyanates was observed over a period of days and was determined in accordance with the American Public Health Association: "Standard Methods for the Examination of Water, Sewage and Industrial Wastes," pages 87–89, 10th Ed. (1955). In the table below, higher numbers indicate a darker color. The first visual perception of color occurs at a reading of about 50. At the start the samples were colorless and the control sample turned yellow in less than 5 days.

| Percent Triphenyl Phosphite | A.P.H.A. Reading, Days | | | |
| --- | --- | --- | --- | --- |
|  | 5 | 7 | 21 | 27 |
| 0 | >150 | >150 | >150 | >150 |
| 0.05 | 10 | 10 | 50 | 50 |
| 0.20 | 10 | 10 | 10 | 10 |
| 0.50 | 10 | 10 | 10 | 10 |

It is obvious from the above figures that the triphenyl phosphite, even at the lowest concentration, is an effective color stabilizer.

When tri(p-tolyl)phosphite, tri(p-chlorophenyl) phosphite or tri(o-tolyl)phosphite is substituted for all or any part of the triphenyl phosphite used above, equal protection against discoloration is obtained.

Example 3

4,4'-methylenediphenylisocyanate was distilled under reduced pressure and the essentially colorless isocyanate was placed into 10-ml. Pyrex tubes, filling them about ¾ full. To the isocyanate in part of the tubes was introduced the percent of triphenyl phosphite indicated in the table below and the materials were stored in an oven at 50° C. The color of the isocyanate was determined by the Gardner scale over a period of days according to ASTM method D154–53. The results are shown in the table below. Higher numbers indicate a greater depth of color.

| Percent Triphenyl phosphite | Gardner Color after— | | | |
|---|---|---|---|---|
| | 1 day | 3 days | 9 days | 28 days |
| 0 | 1 | 3 | >6 | >6 |
| 0.1 | <1 | <1 | 1 | 2 |
| 0.3 | <1 | <1 | <1 | <1 |

The above examples show that the stabilizers in concentrations of from 0.05% to 0.5% based on the weight of the isocyanate prevent the discoloration of the isocyanate in the presence of moisture, air and light. The conditions given in the examples, under which the stabilizers are tested, are quite severe when it is considered that compounds such as organic isocyanates are ordinarily shipped in sealed containers out of contact with atmospheric moisture and oxygen, and often light. When such products are stabilized with the compounds more particularly described above and sealed in iron drums, the effectiveness of the stabilizer will be many times that given for tests carried out in the presence of moisture and air.

Any of the aromatic, aliphatic, cycloaliphatic, mono-, di-, or poly-isocyanates which tend to discolor due to the presence of moisture or oxygen, may be effectively stabilized against discoloration by the addition of the triaryl phosphites above described. As illustrative of the various classes of isocyanates which may be stabilized against discoloration the following list is given, any of which when substituted for the isocyanates of the examples, are stabilized against discoloration when tested according to the procedures described therein:

Toluene-2,6-diisocyanate
4,4'-methylenedi-ortho-tolylisocyanate
2,4,4'-triisocyanatodiphenylether
Toluene-2,4,6-triisocyanate
1-methoxy-2,4,6-benzenetriisocyanate
Meta-phenylenediisocyanate
4-chloro-meta-phenylenediisocyanate
4,4'-biphenyldiisocyanate
1,5-naphthalenediisocyanate
1,4-tetramethylenediisocyanate
1,6-hexamethylenediisocyanate
1,10-decamethylenediisocyanate
1,4-cyclohexanediisocyanate
4,4'-methylene-bis(cyclohexylisocyanate)
1,5-tetrahydronaphthalenediisocyanate
Ortho-meta- or para-tolueneisocyanate
Alpha- and beta-naphthyleneisocyanate
4-methoxy-meta-phenylenediisocyanate.

As many widely different embodiments of this invention may be made without departing from the spirit and scope thereof, it is to be understood that this invention is not limited to the specific embodiments thereof except as defined in the appended claims.

What is claimed is:

1. An organic isocyanate selected from the group consisting of aliphatic, cycloaliphatic and aromatic isocyanates, stabilized against discoloration by having dissolved therein from about 0.05% to 0.5% by weight, based on the isocyanate, of an essentially colorless triaryl phosphite of the formula $(RO)_3P$, wherein R is selected from the group consisting of a phenyl radical, a naphthyl radical, an alkyl-substituted phenyl radical, and a chloro-substituted phenyl radical.

2. Toluene-2,4-diisocyanate stabilized against discoloration by having dissolved therein from about 0.05% to 0.5% by weight, based on the diisocyanate, of an essentially colorless triaryl phosphite of the formula $(RO)_3P$, wherein R is selected from the group consisting of a phenyl radical, a naphthyl radical, an alkyl-substituted phenyl radical, and a chloro-substituted phenyl radical.

3. A composition according to claim 2 wherein the phosphite is triphenyl phosphite.

4. An isomeric mixture of toluene-2,4-diisocyanate and toluene-2,6-diisocyanate stabilized against discoloration by having dissolved therein from about 0.05% to 0.5% by weight, based on the diisocyanate, of an essentially colorless triaryl phosphite of the formula $(RO)_3P$, wherein R is selected from the group consisting of a phenyl radical, a naphthyl radical, an alkyl-substituted phenyl radical, and a chloro-substituted phenyl radical.

5. A composition according to claim 4 wherein the phosphite is triphenyl phosphite.

6. 4,4'-methylenediphenylisocyanate stabilized against discoloration by having dissolved therein from about 0.05% to 0.5% by weight, based on the diisocyanate, of an essentially colorless triaryl phosphite of the formula $(RO)_3P$, wherein R is selected from the group consisting of a phenyl radical, a naphthyl radical, an alkyl-substituted phenyl radical, and a chloro-substituted phenyl radical.

7. A composition according to claim 6 wherein the phosphite is triphenyl phosphite.

References Cited in the file of this patent

UNITED STATES PATENTS

| | | |
|---|---|---|
| 2,253,227 | Cantrell et al. | Aug. 19, 1941 |
| 2,419,354 | Howland et al. | Apr. 22, 1947 |
| 2,485,341 | Wasson et al. | Oct. 18, 1949 |
| 2,679,459 | Rosenwald | May 25, 1954 |
| 2,706,189 | Pruitt et al. | Apr. 12, 1955 |
| 2,803,663 | Kohn | Aug. 20, 1957 |
| 2,847,443 | Hechenbleikner et al. | Aug. 12, 1958 |
| 2,885,420 | Spiegler | May 5, 1959 |